Sept. 11, 1956     R. R. TEALE     2,762,738

WALLBOARD AND METHOD FOR PRODUCING THE SAME

Filed April 24, 1951

INVENTOR.
Robert R. Teale
BY
Bean, Brooks, Buckley & Bean
ATTORNEYS

United States Patent Office 2,762,738
Patented Sept. 11, 1956

2,762,738

WALLBOARD AND METHOD FOR PRODUCING THE SAME

Robert R. Teale, Snyder, N. Y., assignor to National Gypsum Company, Buffalo, N. Y.

Application April 24, 1951, Serial No. 222,597

9 Claims. (Cl. 154—87)

This invention relates to cementitious wallboard and a method and apparatus for producing the same.

The present invention provides a new method and apparatus for producing a novel building panel or wallboard of set cementitious material. While the principles of the present invention are not necessarily thus limited, they will be discussed and described herein in connection with wallboards or panels of set or hydrated calcined gypsum or stucco.

Calcined gypsum has long been recognized as a desirable material for this general purpose because of its non-conductive and fire-resistant properties. However, the density of this material is such that for many years various methods have been employed for reducing the density of walls or panels made therefrom. The earlier attempts were in the nature of lightweight fillers such as fibres or sawdust.

To overcome various objections to the use of fillers for the purpose of reducing density and weight, certain chemicals or minerals were added to the dry calcined gypsum which, upon the addition of water, evolved gas which swelled or expanded the volume of the setting gypsum to form a porous or cellular body. More recently the most common method of producing the desired porosity or cellularity of the set gypsum body has been by the addition to the mix, as the calcined gypsum is being mixed with water, of an inert foam which is in effect an aggregate of minute air bubbles.

The effect of incorporating such an air or gas aggregate is to produce, in a simple and readily controllable manner and without chemically affecting the mix or the chemical constituency of the resultant product, the desired cellular lightweight gypsum body which is particularly desired in gypsum building panels such as wallboard. Examples of materials and methods of producing foam for addition to plastic mixes of calcined gypsum and water are set forth in United States Letters Patent to Carlisle K. Roos, No. 2,080,009, dated May 11, 1937.

A long standing defect in gypsum wall panels or wallboards produced by conventional methods up to the present time has been the fact that wallboards are generally weaker at the very points where greatest strength is desired, namely, along the side edges of the board. The primary cause of this weakness at the edge of a board is the fact that the greater relative surface exposure per unit of volume at the edges of the board results in more rapid drying along the side edges than in the main body of the board.

This more rapid drying results in a partial calcination of the gypsum at and near the edges of the board as a result of which the side edges are more frangible than the body of the board to a greater or lesser degree. This, of course, gives the boards poor handling characteristics and makes them much more readily subject to edge damage in various ways. Further, the calcination of the material at the edges of the board or the excessively fast drying destroys or weakens the bond between the gypsum core and the paper facing in the vicinity of the edges of the board.

In modern relatively high-speed wallboard machines drying of the boards is effected at much higher temperatures than previously. Drying temperatures are in the general range of 300° to 400° Fahrenheit, and this condition aggravates the problem of unequal drying and aggravates the partial calcination of the gypsum at the edges of the boards. In addition to the disadvantages noted above, boards having overdried, calcined, frangible edges are frequently unfit for nailing along their edge portions and when applied in a wall construction exhibit a characteristic known in the art as beading which means a bulging-out of the edge portions of the board. This is due to the fact that stud shrinkage or other conditions arising in building frame constructions frequently cause the boards to be urged into tight abutment. This tight abutment of the weakened board edges causes them to mushroom out and form an unsightly bulge or bead along the joint.

The general object of the present invention is to render the gypsum core stronger along its side edges than has heretofore been the case. One phase of the present invention is to produce wallboards wherein the edge portions of the core are at least of equal strength as compared with the body of the board, and a second phase of the present invention is the provision of a method and means whereby wallboard is produced wherein the edge portions of the monolithic core are, in fact, of greater strength than the remainder of the core.

One specific way in which the general objects of the present invention may be made practically attainable is to provide a method and apparatus for causing the edges of the board to have slower drying characteristics than at present. In boards of the kind most common today, where the mix is aerated in one manner or another to produce a cellular construction, the drying of the board edges may be retarded by omitting the foaming agents from the plastic mix at the edge portions of the board or by eliminating the cellular nature of the board at its edge portions in some other manner. In this case the board edges, while free of foam, will still have such porosity as is due to voids remaining as a result of the removal of water upon drying, and the center portions of the boards will inherently have similar porosity in addition to the voids due directly to the foam bubbles.

One practical means of accomplishing the objects of the present invention is by feeding three separate streams of plastic core material to the wallboard machine table in advance of the master rolls, the two outside streams being relatively narrow and composed of a cementitious slurry having little or no foam, while the center stream of material forming the main body of the board is foamed or aerated to produce the desired cellular lightweight product. Reference is had here to a central stream or slurry, but this stream may in fact be initially deposited as several separate streams which later merge on the board machine table.

A further method and means of accomplishing the objects of the present invention is to deposit all of the cementitious slurry in a foamed state as at present and then eliminate the foam from the edge portions of the deposit by agitation, the use of de-foaming agents, or otherwise.

The single practical method and apparatus and article illustrated in the drawing and described in detail in the following specification is by way of example only. The present invention is not to be considered as limited thereto or otherwise than as defined in the appended claims.

Figure 1:
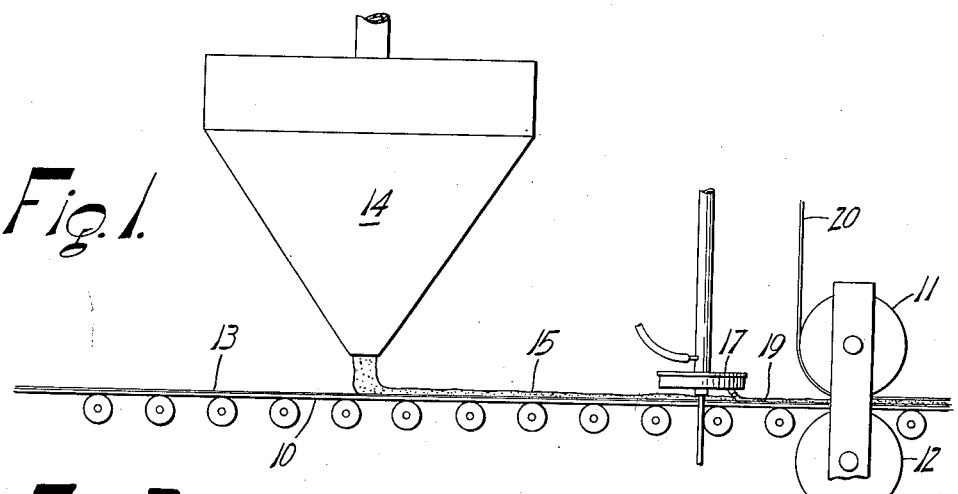
Fig. 1 is a fragmentary somewhat schematic side elevational view of a continuous wallboard machine which is generally conventional in construction and arrangement but is adapted to perform one form of the method of the present invention.

Like characters of reference denote like parts and the numeral 10 designates the usual continuously moving table of a gypsum wallboard machine and 11 and 12 designate upper and lower caliper or master rolls. A lower paper facing sheet is designated 13 and a main mixer 14 deposits a stream of mixed calcined gypsum, water and foam on sheet 13 in the usual manner.

In conventional wallboard manufacture, at least in one common mode of procedure, the side edges of lower facing sheet 13 are turned up at right angles, preferably but not necessarily before sheet 13 arrives at the main mixer 14. Subsequently, and commonly just before the sheet reaches the master rolls, these upstanding edge portions of sheet 13 are turned inwardly over the top of the deposited core and immediately thereafter a top cover sheet is applied just as the facing sheet 13 and the deposited core reach and begin to pass between the master rolls.

The instrumentalities for effecting the upfolding and the infolding of the facing sheet 13 are entirely conventional and, since they do not affect the principles of the present invention, they are not illustrated in the drawing.

Figure 2:
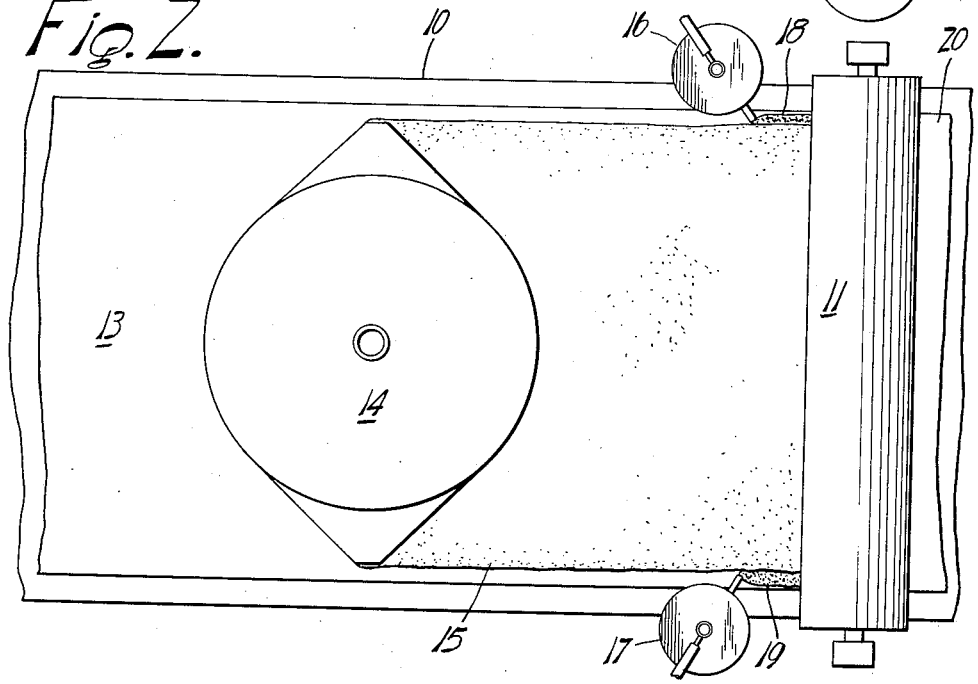
Fig. 2 is a top plan view of the apparatus of Fig. 1.

Mixer 14 may be a ball mixer, a pin mixer, a combination of both, or of any other suitable type. In Figs. 1 and 2 mixer 14 is shown schematically as depositing a single relatively wide stream of slurry designated 15. In actual practice a common expedient is to deposit several separate streams across the table, the plastic streams merging by lateral gravitational flow before reaching the master rolls.

In the form of the invention illustrated herein by way of example a pair of relatively small auxiliary mixers 16 and 17 are disposed between the main mixer 14 and the master rolls 11 and 12 and in such position that they each deposit a stream of mixed slurry, designated 18 and 19 respectively in Fig. 2, along one marginal edge of the main stream or body of slurry 15. In the alternative, a single supplementary mixer, located wherever convenient, may be provided with two discharge openings or a single discharge opening with two chutes or spouts for depositing the two edge streams.

In one preferred method of practicing the present invention the slurries from the auxiliary mixers 16 and 17 may be the same as to ingredients and proportions as the main stream 15 excepting only that the foam or foaming agent is omitted and consequently streams 18 and 19 from the mixers 16 and 17 and the set gypsum which they form on drying are of markedly greater density than the porous main central body which forms when the stream 15 dries and sets up.

Considering the lengthwise direction of the apparatus of Figs. 1 and 2, the auxiliary feeders 16 and 17 need not be located as there shown, but may be closer to the main mixer 14 and, in fact, may be to the left of main mixer 14 as viewed in Figs. 1 and 2, so that the side streams of slurry 18 and 19 are deposited in advance of the deposit of the main stream 15.

The upstanding edges of the facing sheet 13 are folded in over the deposited slurry between the auxiliary mixers 16 and 17 by conventional means not shown and an upper paper facing sheet 20 is applied over the slurry streams 15, 18, and 19 and over the inturned edges of facing sheet 13 at the master rolls 11 and 12 in a conventional manner. The subsequent apparatus and operation of the entire wallboard machine is entirely conventional in the manner in which the boards are dried and cut to length.

However, because of the greater density of the gypsum and water mix at the board edges, the drying rate along such edges is retarded so that, despite the greater surface exposure and the fact that the boards are usually thinner along their side edges, the drying rate at such edges is as slow as in the main cellular body of the board and preferably even slower, whereby there is no recalcination of the gypsum at the board edges. In the form of the invention here described the superior quality and strength of the board edges is due jointly to the greater density at such edges and the added strength arising directly therefrom, as well as to the greater strength which arises from the fact that the slurry at the edges, by the retardation of its drying forms a fully set body of completely hydrated calcium sulphate.

Figure 3:
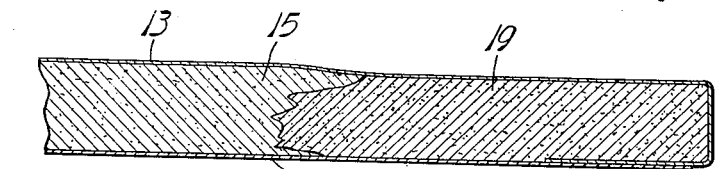
Fig. 3 is a cross-section through the edge portion of one form of the improved wallboard of the present invention.

In the general method of wallboard manufacture referred to herein by way of example, the wallboards are fabricated with their front or outer faces down so that lower facing sheet 13 is the front facing sheet of the ultimate wallboard or panel, as appears from a consideration of Fig. 3 which shows one side edge portion of such a wallboard in cross-section. It will be noted from Fig. 3 that the slurries 15, 18, and 19 form a single monolithic core of the same set cementitious material, although the edge portions thereof, as at 19, are denser and harder than the cellular central portion indicated at 15 in Fig. 3.

As indicated earlier herein, the desired physical properties and characteristics of the edges of wallboards may be attained in a variety of ways, all within the general teachings of the present invention. However, by way of example, where the difference in density owing to the absence of foam is the only or main distinguishing characteristic of the slurries used for the edges of the board, it has been found that certain practical minimum density differentials should be observed.

For instance, where the density of the middle part of the set but undried cellular gypsum core is such that a cylindrical block thereof three inches in diameter and three inches long weighs 480 grams, then the relatively non-cellular set but undried material at the board edges should, in a specimen of the same size, weigh at least from 520 to 540 grams. This indicates a minimum wet density differential of about nine per cent and the relative density differential after drying will be substantially the same.

What is claimed is:

1. The method of manufacturing gypsum wallboard which comprises depositing a central stream of foamed plastic gypsum on a table and depositing separate streams of relatively unfoamed plastic gypsum in a plastic state along opposite sides of the central stream, leveling the combined streams to form a single flat slab, and drying to produce a unitary monolithic core having edge portions of greater density than the main central portion of the monolithic core.

2. The method of manufacturing gypsum wallboard which comprises depositing a central stream of foamed plastic gypsum on a cover sheet and depositing separate streams of unfoamed plastic gypsum in a plastic state on said cover sheet along opposite sides of the central stream, applying a cover sheet for the opposite face of the wallboard over the combined streams, leveling the composite assembly thus formed, and drying to produce a wallboard having a unitary monolithic core having edge portions of greater density than the main central portion of the monolithic core.

3. The method of manufacturing gypsum wallboard which comprises depositing a main stream of foamed plastic gypsum on a table and depositing a separate stream of unfoamed plastic gypsum in a plastic state alongside the main stream, leveling the combined streams to form a single flat slab, and drying to produce a unitary monolithic core having an edge portion of greater density than the main central portion of the monolithic core.

4. The method of manufacturing gypsum wallboard which comprises depositing a central stream of cellular plastic gypsum on a table and depositing separate streams of relatively non-cellular plastic gypsum in a plastic state alongside the central stream, leveling the combined streams to form a single flat slab, and drying to produce a unitary monolithic core having side marginal portions of greater density than the main central portion of the monolithic core.

5. Gypsum wallboard comprising a relatively flat monolithic slab of set hydrated gypsum and paper cover sheets bonded to the surfaces, thereof, the gypsum comprising said slab being generally cellular but the gypsum comprising the opposite longitudinal side marginal portions thereof being relatively non-cellular and of greater density than the main body portion of said slab.

6. Gypsum wallboard comprising a relatively flat monolithic slab of set hydrated gypsum and paper cover sheets bonded to the surfaces thereof, the gypsum comprising said slab being generally cellular but the gypsum comprising the opposite longitudinal side marginal portions thereof being relatively non-cellular and of greater density than the main body portion of said slab by a minimum of approximately nine per cent.

7. Gypsum wallboard comprising a relatively flat monolithic slab of set hydrated gypsum and paper cover sheets bonded to the surfaces thereof, the gypsum comprising said slab being generally of a density before drying of aproximately 480 grams per standard 3″ x 3″ cylinder and the density before drying of the gypsum comprising the opposite longitudinal side marginal portions thereof being at least 520 grams per standard 3″ x 3″ cylinder.

8. Gypsum wallboard comprising a relatively flat monolithic slab of set hydrated gypsum and paper cover sheets bonded to the surfaces thereof, the gypsum comprising the opposite longitudinal side marginal portions of said slab being of a greater density than the gypsum comprising the remaining main body portion by a minimum of about nine per cent.

9. Gypsum wallboard comprising a relatively flat monolithic slab of set hydrated gypsum and paper cover sheets bonded to the surfaces thereof, the gypsum comprising the central portion of said slab being of foamed gypsum and the opposite side marginal portions thereof being of unfoamed gypsum.

References Cited in the file of this patent

UNITED STATES PATENTS

| | | |
|---|---|---|
| 1,333,579 | Schumacher | Mar. 9, 1920 |
| 1,489,693 | Brookby | Apr. 8, 1924 |
| 1,578,250 | Armstrong | Mar. 30, 1926 |
| 1,663,506 | Mason | Mar. 20, 1928 |
| 1,719,726 | Raynes | July 2, 1929 |
| 1,725,243 | Avery | Aug. 20, 1929 |
| 2,080,009 | Roos | May 11, 1937 |
| 2,089,087 | Fletcher | Aug. 3, 1937 |
| 2,276,869 | Pond | Mar. 17, 1942 |